United States Patent
Ikebe

(10) Patent No.: US 8,153,007 B2
(45) Date of Patent: Apr. 10, 2012

(54) METHOD OF TREATING WASTEWATER

(75) Inventor: Hiroaki Ikebe, Narashino (JP)

(73) Assignee: Toyo Engineering Corporation, Tokyo (JP)

( * ) Notice: Subject to any disclaimer, the term of this patent is extended or adjusted under 35 U.S.C. 154(b) by 296 days.

(21) Appl. No.: 12/380,819

(22) Filed: Mar. 4, 2009

(65) Prior Publication Data
US 2009/0230056 A1    Sep. 17, 2009

(30) Foreign Application Priority Data

Mar. 14, 2008 (JP) .................... 2008-066721
Jan. 22, 2009 (JP) .................... 2009-012105

(51) Int. Cl.
*C02F 3/00* (2006.01)
(52) U.S. Cl. ........................ 210/614; 210/631
(58) Field of Classification Search .............. 210/791, 210/797, 798, 614, 631, 650, 652, 669, 670, 210/673, 675
See application file for complete search history.

(56) References Cited

U.S. PATENT DOCUMENTS

| | | | |
|---|---|---|---|
| 5,494,577 A * | 2/1996 | Rekers | 210/321.8 |
| 2007/0215544 A1 | 9/2007 | Kando et al. | |
| 2010/0072131 A1* | 3/2010 | Nick et al. | 210/605 |
| 2010/0113324 A1* | 5/2010 | Baldridge et al. | 510/493 |

FOREIGN PATENT DOCUMENTS

| | | |
|---|---|---|
| CN | 101053775 | 10/2007 |
| JP | 06-034999 | 5/1994 |

OTHER PUBLICATIONS

Chinese Office Action dated Nov. 23, 2011 for corresponding Chinese Application No. 200910128621.7, with English translation.

* cited by examiner

*Primary Examiner* — Chester Barry
(74) *Attorney, Agent, or Firm* — Flynn, Thiel, Boutell & Tanis, P.C.

(57) ABSTRACT

A method of treating a wastewater, containing the steps of: filtering a wastewater supplied into an activated sludge tank and biologically-treated therein, in a membrane module installed outside the activated sludge tank; chemical-cleaning the membrane module with a membrane-cleaning agent while the membrane module is disconnected from the activated sludge tank with a valve; and water-flushing off the substances contained in the wastewater that react with the membrane-cleaning agent and form hazardous substances and/or operation-inhibiting substances, or the membrane-cleaning agent remaining in the membrane module with water while the membrane module and the activated sludge tank are disconnected from each other by the valve, wherein the membrane-cleaning agent is prevented from contacting the substances contained in the wastewater that react with the membrane-cleaning agent and form hazardous substances and/or operation-inhibiting substances.

8 Claims, 5 Drawing Sheets

METHOD OF TREATING WASTEWATER

FIELD OF THE INVENTION

The present invention relates to wastewater treatment by using a membrane separation method for use, for example, in petrochemical and petroleum refining plants. In particular, the present invention relates to a method of treating wastewater and a wastewater treatment apparatus that are used when the wastewater contains substances that generate hazardous substances and substances inhibiting wastewater treatment process, in reaction with the membrane-cleaning agent, and membranes used in membrane separation methods should be chemically cleaned periodically with a membrane-cleaning agent.

BACKGROUND OF THE INVENTION

Conventionally, industrial wastewaters containing organic matter from various industries have been treated by biological treatments such as the standard activated sludge method. The standard activated sludge method is a biological treatment method which treats organic wastewater aerobically. FIG. 7 is a flow chart showing the standard activated sludge method. Incoming wastewater is fed into an activated sludge tank 101, and the organic matter (phenol, benzene, etc.), nitrogen, phosphorus, and others therein are biologically treated with activated sludge, which is a group of various microbes. Then, after sedimentation of the activated sludge in a sedimentation tank 102, the excess sludge is withdrawn and the supernatant liquid is obtained as the treated water. Although organic substances could be treated by the method, the quality (clarity) of the treated water was insufficient and thus the treated water was underqualified for being recycled, for example, as industrial water.

Recently, on the other hand, the so-called membrane-separation activated sludge method or membrane bioreactor (MBR) method by using ultrafiltration membrane has been employed for treatment of sewage and excrement, and the treated water is recycled in some cases. FIG. 8 is a flow chart showing the membrane-separation activated sludge method (membrane bioreactor (MBR) method). Incoming wastewater is fed into an activated sludge tank 101 for biological treatment of the organic matter (phenol, benzene, etc.), nitrogen, phosphorus and others with activated sludge which is a group of various microbes. Then, the wastewater is separated from the solids and concentrated by filtration with a membrane module 103 to give filtered water. The filtered water is clear and recyclable. In addition, the membrane-separation activated sludge method has many advantages over the standard activated sludge method in that the treatment can be carried out in a compact area, maintenance and control are easier, and the system is resistant to fluctuations in load (e.g., see JP-B-6-34999 ("JP-B" means examined Japanese patent publication)).

However, there is almost no known example of application of the membrane-separation activated sludge method to industrial wastewaters such as those from petrochemical and petroleum refining plants.

One of the reasons for that is that industrial wastewaters, especially those from petrochemical and petroleum refining plants, often contain organic compounds that change into highly toxic substances in a reaction with chlorine, though the membrane-separation activated sludge method demands periodical injection of chlorine or a chlorine compound (a chlorine-based chemical) as the membrane-cleaning agent for sterilization (cleaning) of the internal and external surface of the membrane in membrane module, so that the highly toxic substances are produced when washing the membrane. The membrane-separation activated sludge method commonly used is an immersion-type membrane-separation activated sludge method of immersing a membrane module 104, as shown in FIG. 9, in a sludge tank (aeration tank) 101 and filtering the wastewater by suction with a suction pump 105, thereby obtaining the filtered water. In such an immersion-type membrane-separation activated sludge method, the valve 106 is closed during membrane cleaning and, normally, a chlorine-based chemical is supplied into the membrane module 104, as indicated by an arrow in the FIG. 9. There was some concern then about the generation of toxic chlorinated organic compounds such as chlorophenol 108, in a reaction of chlorine with the organic compounds such as phenol 107 contained biologically untreated in the wastewater. Because chlorophenol is a compound with a noticeable foreign odor, even if present in a trace amount, thus, the presence of the chlorophenol in the filtered water, even in a trace amount, prohibits recycling of the filtered water significantly.

The membrane-separation activated sludge method demands periodical chlorination by using a chlorine-based chemical but, disadvantageously, in the wastewater to be treated, there are often metals, such as manganese, that are oxidized in the presence of chlorine to metal compounds that precipitate on the surface or in the membrane of the membrane module. The metal compounds precipitating on the surface of or in the membrane of membrane module may inhibit the operation of the wastewater treatment facility and may also cause the same problem of metal compound precipitation in a reaction with an alkali agent contained in the membrane-cleaning agent.

In wastewater treatment to which the membrane-separation activated sludge method is applied, the membrane should be cleaned periodically with a membrane-cleaning agent, and there are cases where the wastewater to be treated contains substances generating hazardous substances and substances inhibiting a treatment process in a reaction with the membrane-cleaning agent. The inhibition of the treatment process above means the deposition of operation-inhibiting substances on the membrane surface or precipitation thereof in the membrane, clogging the membrane and inhibiting membrane separation.

The present invention is related, for example, to a process of treating a wastewater containing substances generating chlorine-based toxic compounds in reaction with the chlorine-based chemical normally used as the membrane-cleaning agent. Examples of hazardous compound-generating substances include activated aromatic compounds such as phenol and aniline and carbonyl compounds such as aldehydes and ketones. Phenol, one of the compounds above, generates toxic chlorophenol with a strong odor in reaction with chlorine.

Further, if metals (metal ions) are contained in the wastewater, the metals may form, in a reaction, for example, with chlorine or an alkali agent in the membrane-cleaning agent, metal compounds that deposit on the surface of the membrane of membrane module and precipitate inside the membrane clogging the membrane and thus reducing filtration capacity significantly. For example, manganese is oxidized in the presence of chlorine, giving a precipitate of hydrated manganese dioxide ($MnO_2 \cdot mH_2O$), and leading to the deposition thereof on the membrane surface, precipitation inside the membrane, clogging the membrane and reducing the filtration capacity. In addition, lead precipitates as $PbCl_2$ in a reaction with hydrochloric acid.

Metals such as iron and manganese are drastically less soluble in the alkali-side region of pH and, thus, alkali cleaning immediately after acid cleaning highly possibly results in the precipitation of the metal compounds on the membrane surface and inside the membrane.

Thus, there is a demand for the prevention of precipitation of such metal compounds on the surface of and in the membrane of the membrane module.

In comparison with internal-tank membrane modules, external-tank membrane modules allow the use of a membrane-cleaning agent at higher concentrations (to the degree permitted by the membrane material) without an influence on the in-tank microbes, even if it is a bactericide-based agent, an alkali-based agent, or an acid-based agent, but use of such a membrane-cleaning agent at a high concentration may possibly enhance the concern about the precipitation of by-products and metal compounds.

SUMMARY OF THE INVENTION

The present invention provides a wastewater treatment method and apparatus for a membrane-separation activated sludge method that is applicable to industrial wastewaters such as those from petrochemical and petroleum refining plants, by taking advantage of the easiness in cleaning of external-tank membrane modules and avoiding the problems of precipitation of by-products and metal compounds.

The present invention resides in a method of treating a wastewater, comprising the steps of:

filtering a wastewater supplied into an activated sludge tank and biologically-treated therein, in a membrane module installed outside the activated sludge tank;

chemical-cleaning the membrane module with a membrane-cleaning agent while the membrane module is disconnected from the activated sludge tank with a valve; and water-flushing off the substances contained in the wastewater that react with the membrane-cleaning agent and form hazardous substances and/or operation-inhibiting substances, or the membrane-cleaning agent remaining in the membrane module with water while the membrane module and the activated sludge tank are disconnected from each other with the valve, wherein the membrane-cleaning agent is prevented from contacting the substances contained in the wastewater that react with the membrane-cleaning agent forming hazardous substances and/or operation-inhibiting substances.

Further, the present invention resides in a wastewater treatment apparatus, comprising: an activated sludge tank; a membrane module installed outside the activated sludge tank for membrane separation of the mixture of a wastewater and activated sludge; and a valve being able to disconnect the membrane module outside the tank and the activated sludge tank from each other during chemical cleaning of the membrane module, wherein the membrane-cleaning agent is prevented from contacting the substances contained in the wastewater that react with the membrane-cleaning agent and form hazardous substances and/or operation-inhibiting substances.

Other and further features and advantages of the invention will appear more fully from the following description, appropriately referring to the accompanying drawings.

DETAILED DESCRIPTION OF THE INVENTION

Figure 1:
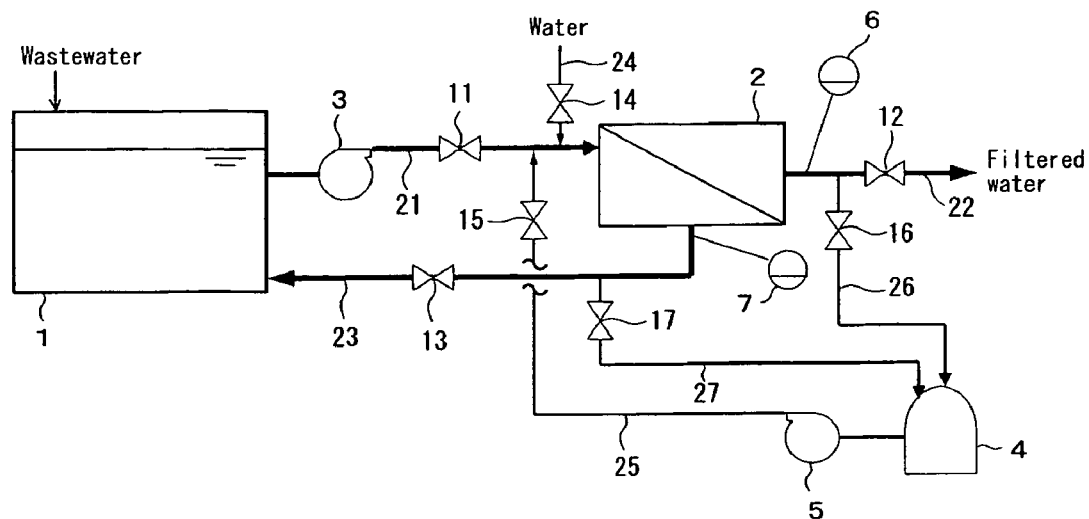
FIG. 1 is an explanatory diagram showing the configuration of an example of the wastewater treatment apparatus according to the present invention.

According to the present invention, there are provided the following means:

(1) a method of treating a wastewater, comprising the steps of:

filtering a wastewater supplied into an activated sludge tank and biologically-treated therein, in a membrane module installed outside the activated sludge tank;

chemical-cleaning the membrane module with a membrane-cleaning agent while the membrane module is disconnected from the activated sludge tank with a valve; and water-flushing off the substances contained in the wastewater that react with the membrane-cleaning agent and form hazardous substances and/or operation-inhibiting substances, or the membrane-cleaning agent remaining in the membrane module with water while the membrane module and the activated sludge tank are disconnected from each other by the valve, wherein the membrane-cleaning agent is prevented from contacting the substances contained in the wastewater that react with the membrane-cleaning agent forming hazardous substances and/or operation-inhibiting substances;

(2) a method of treating a wastewater, comprising the steps of:

filtering a wastewater supplied into an activated sludge tank and biologically-treated therein, in a membrane module installed outside the activated sludge tank;

first water-flushing off the substances contained in the wastewater that react with the membrane-cleaning agent and form hazardous substances and/or operation-inhibiting substances remaining in the membrane module with water while the membrane module is disconnected from the activated sludge tank by a valve;

chemical-cleaning the membrane module with a membrane-cleaning agent while the membrane module is disconnected from the activated sludge tank with the valve; and second water-flushing off the membrane-cleaning agent remaining in the membrane module with water while the membrane module and the activated sludge tank are disconnected from each other by the valve, wherein the membrane-cleaning agent is prevented from contacting the substances contained in the wastewater that react with the membrane-cleaning agent forming hazardous substances and/or operation-inhibiting substances;

(3) a method of treating a wastewater, comprising the steps of:

carrying away a wastewater supplied into an activated sludge tank and biologically-treated therein from the activated sludge tank to a membrane filtration tank outside the activated sludge tank and filtering the wastewater in a membrane module installed in the membrane filtration tank;

first water-flushing off the substances contained in the wastewater that react with the membrane-cleaning agent and form hazardous substances and/or operation-inhibiting substances remaining in the membrane module with water while a wastewater supply pump is halted, which the pump supplies the wastewater from the activated sludge tank to a membrane filtration tank;

chemical-cleaning the membrane module with a membrane-cleaning agent while the wastewater supply pump is halted and the membrane filtration tank is disconnected from the activated sludge tank with a valve; and second water-flushing off the membrane-cleaning agent remaining in the membrane module with water while the wastewater supply pump is halted and the membrane module and the activated sludge tank are disconnected from each other by the valve, wherein the membrane-cleaning agent is prevented from contacting the substances contained in the wastewater that react with the membrane-cleaning agent and form hazardous substances and/or operation-inhibiting substances;

(4) the method of treating a wastewater according to any one of the above items (1) to (3), wherein the wastewater is a wastewater containing organic matter which generate toxic chlorine-based organic matters in a reaction with chlorine and/or a wastewater containing metals which generate metal compounds which precipitate on the surface and/or in the membrane in a reaction with chlorine or an alkali agent;

(5) the method of treating a wastewater according to any one of the above items (1) to (4), wherein, after the chemical cleaning step, the chemical remaining in the membrane module is flushed off with water to a predetermined concentration or less, then the valve disconnecting the membrane module outside the tank and the activated sludge tank is opened;

(6) the method of treating a wastewater according to the above item (5), wherein the water used for the water flushing step is discharged to a place other than that where it is brought into contact with the wastewater;

(7) the method of treating a wastewater according to any one of the above items (1) to (6), wherein operation of the chemical cleaning step and the water flushing step is controlled with automatic analyzers and/or a timer;

(8) the method of treating a wastewater according to any one of the above items (1) to (7), wherein the membrane module is composed of an ultrafiltration membrane, a microfiltration membrane, a reverse osmosis membrane, or an ion exchange membrane;

(9) the method of treating a wastewater according to any one of the above items (1) to (8), wherein the valve is a three-way valve;

(10) a wastewater treatment apparatus, comprising: an activated sludge tank; a membrane module installed outside the activated sludge tank for membrane separation of the mixture of a wastewater and activated sludge; and a valve able to disconnect the membrane module outside the tank and the activated sludge tank from each other during chemical cleaning of the membrane module, wherein the membrane-cleaning agent is prevented from contacting the substances contained in the wastewater that react with the membrane-cleaning agent forming hazardous substances and/or operation-inhibiting substances; and

(11) the wastewater treatment apparatus according to the above item (10), wherein the valve is a three-way valve.

The present invention is further described below in detail.

The inventor has found that it was possible to prevent the generation of toxic compounds and clogging of a membrane by the precipitation of metal compounds on the surface of and in the membrane of membrane module, by employing a particular structure or operation in the membrane-separation activated sludge method that prevents contact of the membrane-cleaning agent used in cleaning the membrane with the organic matters and the metals contained in the wastewater. The present invention is made based on the finding above.

The wastewater treatment method according to the present invention, comprises the steps of: filtering a wastewater, supplied into an activated sludge tank and biologically-treated therein, in a membrane module installed outside the activated sludge tank; chemical-cleaning the membrane module with a membrane-cleaning agent while the membrane module is disconnected from the activated sludge tank by a valve; and water-flushing off the substances contained in the wastewater that react with the membrane-cleaning agent and form hazardous substances and/or operation-inhibiting substances, or the membrane-cleaning agent remaining in the membrane module with water while the membrane module and the activated sludge tank are disconnected from each other by the valve, wherein the membrane-cleaning agent is prevented from contacting the substances contained in the wastewater that react with the membrane-cleaning agent forming hazardous substances and/or operation-inhibiting substances.

The wastewater to be treated in the wastewater treatment according to the present invention is a wastewater containing substances that react with the membrane-cleaning agent and form hazardous substances and/or operation-inhibiting substances. Examples thereof include, but are not limited to, wastewaters containing organic matter which generate toxic chlorine-based organic compounds in a reaction with chlorine, and wastewaters containing metals forming metal compounds which precipitate on the surface of and in the membrane in membrane modules in a reaction with chlorine or an alkali agent. Examples of these wastewaters include those from petrochemical plants and petroleum refining plants. In the present invention, the metals contained in the wastewater include their metal ions.

The membrane-cleaning agent for use in the present invention may be any agent used for cleaning the surface or the internal region of the membrane in a membrane module in a conventional immersion type membrane-separation activated sludge method and thus may be, for example, a chlorine-based agent such as hypochlorous acid.

Examples of the substances which generate toxic chlorine-based organic compounds in reaction with chlorine include aromatic compounds (phenol compounds, aniline compounds, etc.) and carbonyl compounds (aldehyde compounds, ketone compounds, etc.).

Examples of the metals generating metal compounds which precipitate on the surface of and in the membrane in membrane modules and thus clog the membrane (membrane-clogging substances) in a reaction with chlorine or an alkali agent include manganese, iron and the like.

If hydrochloric acid, for example, is used as the membrane-cleaning agent, wastewaters containing lead compounds, which possibly generate such metal compounds (membrane-clogging substance) in a reaction, are also included in the wastewater to be treated.

In the present invention, a membrane module is installed outside an activated sludge tank with respect to the membrane-separation activated sludge method. The membrane module is not particularly limited provided that the membrane module is installed outside the activated sludge tank, it can be used as an external tank system that the membrane module independently is set or an immersion-type that the membrane module is immersed in a membrane filtration tank. In the membrane-separation activated sludge method in the external tank system, the activated sludge-containing biologically-treated wastewater is fed to and filtered in a membrane module installed outside the aeration tank (activated sludge tank) under pressure, and the filtration step of the wastewater itself can be carried out properly, for example, with reference to the description in JP-B-46-41584. Alternatively, the wastewater can be fed into a membrane filtration tank outside aeration tank under pressure and filtered in an immersion type membrane module installed there by suction.

In the present invention, the contact between the organic matter, metals and others in wastewater and the membrane-cleaning agent during chemical cleaning of the surface and internal region of the membrane module is disconnected with a valve placed between the activated sludge tank and the membrane module placed outside. In the case of the immersion type, the wastewater is fed to the membrane filtration tank installed outside the aeration tank by a pump and filtered in the membrane module immersed in the membrane filtration tank with suction. As stated in detail below, the contact between the organic matter, metals and others in the wastewater and the membrane-cleaning agent is inhibited by replacing the water in the membrane filtration tank before each of the steps.

Preferably in the present invention, contact between organic impurities or metals in wastewater and the membrane-cleaning agent is prevented by flushing off the agent used in the chemical cleaning step completely out of the membrane module in the water flushing step to the degree it causes no problem in membrane separation.

It is also preferable to prevent contact and reaction between the membrane-cleaning agent and the substances in wastewater by installing automatic analyzers such as a pH meter, electric conductivity meter and chemical densitometer on pipes downstream of the membrane module and controlling the operation by timely monitoring the cleaning state and the wastewater in the water-flushing and chemical cleaning steps. Such operational control can prevent damage to the membrane by cleaning automatically.

The operational control can be achieved by programming the system to conduct switching, such as of valves and pumps, in each step when a measured value, for example of pH, conductivity, chemical concentration or time, reaches a particular value. It is also possible to control the flow rate automatically in this way.

Specific switching of steps may be determined arbitrarily, but in the water flushing step after the chemical cleaning step, it is preferable to flush off the chemical agent remaining in the membrane module sufficiently, to a predetermined concentration, for example to less than 1/100 of the initial concentration in the cleaning solution used for cleaning, before opening the valve disconnecting the membrane module outside the tank from the sludge tank and resumption of operation in the filtration step.

The concentration of the membrane-cleaning agent in the membrane module is determined properly to a value generating almost no hazardous substances or causing no problem if such substances are generated.

The concentration of the membrane-cleaning agent used in cleaning in the present invention may be determined arbitrarily, however, because cleaning of the membrane module is carried out while the activated sludge tank is completely disconnected in the present invention, it is possible to conduct cleaning in a shorter period of time by using a cleaning solution at a higher concentration than in the conventional immersion-type cleaning and thus reduce the amount of the chemical used, when the total amount is considered.

The water used in the flushing step is preferably discharged out of the system, instead of being fed back to a tank such as a wastewater-receiving tank where the water is brought into contact with the wastewater. It is possible in this way to prevent contact of even the low-concentration membrane-cleaning agent contained in the water used in the flushing step with the organic matters and metals in wastewater.

Further, conventionally, acid cleaning and subsequent alkali cleaning result in scaling on the surface of and in the membrane of the membrane module during membrane cleaning, the membrane was traditionally cleaned, normally first with an alkaline agent such as sodium hypochlorite, then with an acid and then neutralized, wherein a scale means a substance dissolved or suspended in water precipitating or sedimentation and hardening on the surface of and in the membrane for various reasons. In the present invention, sufficient flushing can reduce the amount of the acid used for neutralization. Acid cleaning immediately after hypochlorous acid cleaning often results in chlorine generation, possibly damaging the membrane, but in the present invention, water-substitution operation of the membrane-cleaning agents in the water flushing step before and after the cleaning step allows treatment without concern about such a trouble.

It is also preferable to prevent the generation of hazardous substances with the residual wastewater or the residual membrane-cleaning agent by eliminating the dead space (liquid reservoir) in piping, for example by using a three-way or four-way valve.

Two common switching valves, when used as valves, produce a dead space between the two valves. The dead space allows the residual of the membrane-cleaning agent there and, when the wastewater is supplied in the following step, these two liquids are brought into contact with each other, possibly forming hazardous substances. On the other hand, the residual of the wastewater and supply of the membrane-cleaning agent also causes the same problem. Use of a three-way or four-way valve as the switching valve allows the reduction of the dead space in the region close to the switching area and eliminates the concern about contact of these liquids.

The membrane module for use in the present invention is not particularly limited but, favorably, for example, a membrane module composed of an ultrafiltration membrane, a microfiltration membrane, a reverse osmosis membrane, or an ion-exchange membrane.

In the present invention, the membrane module is a unit containing a membrane as described above in a housing and may have any shape.

Another embodiment of the present invention is a wastewater treatment apparatus, comprising an activated sludge tank; a membrane module installed outside the activated sludge tank, for membrane separation of the activated sludge-containing wastewater; and a valve able to disconnect the membrane module outside the tank from the activated sludge tank during chemical cleaning of the membrane module, wherein the membrane-cleaning agent is prevented from contacting the substances contained in the wastewater that react with the membrane-cleaning agent forming hazardous substances and/or operation-inhibiting substances. The members, chemicals and the like are the same as those described above. The substances possibly generating hazardous substances or operation-inhibiting substances in reaction with the membrane-cleaning agent are also the same as the substances that react with the membrane-cleaning agent and form hazardous substances and/or operation-inhibiting substances described above.

It is possible to prevent the generation of hazardous compounds by the structure and the operation according to the present invention in which the contact between the membrane-cleaning agent, such as chlorine used in membrane sterilization, and the organic matters contained in the wastewater is prevented. The present invention is also effective in treatment of wastewaters containing metals which form metal compounds on the surface of and in the membrane of membrane module in a reaction with the agents.

The treatment method and the treatment apparatus of wastewater according to the present invention is a method and an apparatus allowing the treatment of industrial wastewaters, for example, from petrochemical and petroleum refining plants without the generation of hazardous substances, and the clear filtered water obtained by membrane separation can be recycled, for example, as industrial water. Thus, the method and the apparatus are advantageous in reducing the environmental load by reduction of the discharge amount of wastewater as well as in providing a new water resource.

According to the present invention, the membrane-separation activated sludge method is applicable to such a wastewater safely, consequently allowing advanced treatment of the wastewater and promoting recycling of the filtered water, for example, as industrial water.

Hereinafter, preferred embodiments of the present invention will be described with reference to the drawings, but the present invention is not limited thereto.

FIG. 1 is an explanatory diagram explaining the configuration of an example of the wastewater treatment apparatus according to the present invention. The apparatus shown in FIG. 1 comprises an activated sludge tank 1, a membrane module 2 placed outside the activated sludge tank 1, a membrane feed pump 3, a chemical tank 4, a chemical cleaning pump 5, automatic analyzers 6 and 7, valves 11 to 17, and lines (pipes) 21 to 27 connecting these elements to each other.

The valves 11 and 13 are the valves capable of disconnecting the membrane module 2 placed outside the activated sludge tank 1 from the activated sludge tank 1. Although one valve is shown in each line in FIG. 1, the valves 11, 14 and 15, for example, may be replaced with a four-way valve, or the valves 12 and 16 or 13 and 17 may be replaced with a three-way valve, for reduction of the dead space (liquid pool) in the switching area as much as possible.

The arrow of each line indicates the direction of the fluid flow in the line.

FIGS. 2 to 5 are explanatory diagrams showing the operation flow of the apparatus shown in FIG. 1. Among the valves 11 to 17 shown in FIGS. 2 to 5, those in black are closed and those in white on black are opened.

Figure 2:
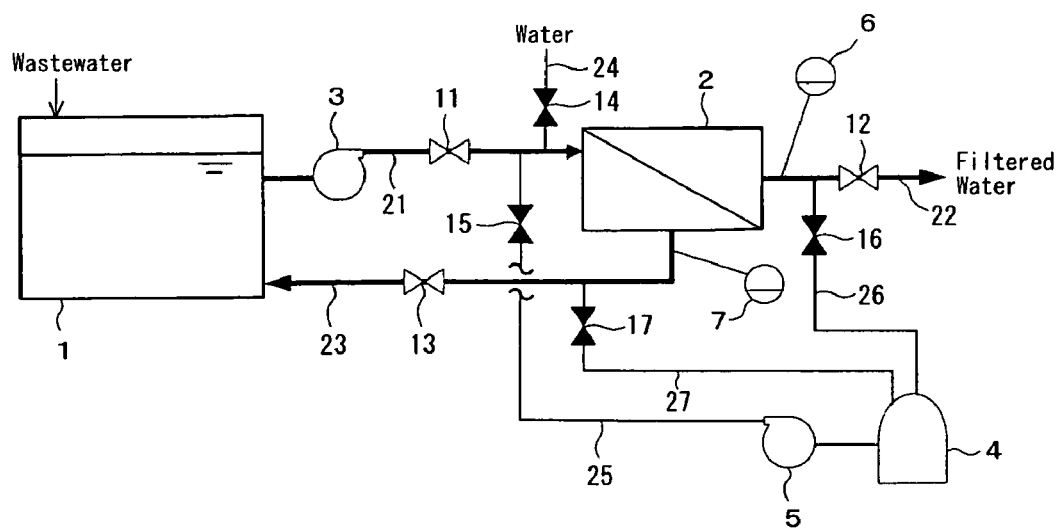
FIG. 2 is an explanatory diagram showing the operation of the apparatus shown in FIG. 1 in the filtration step.

FIG. 2 is an explanatory diagram showing the operation state in the filtration step. Here, the valves 11, 12 and 13 are opened and the other valves are closed.

The wastewater is fed into the activated sludge tank 1 and biologically treated therein. The activated sludge-mixing wastewater is fed via line 21 into the membrane module 2 by the membrane feed pump 3 and filtered therein, and the obtained clear filtered water is fed via line 22 out of the system and used, for example, appropriately for recycling. On the other hand, the solids not permeating the membrane is fed with water via line 23 back into the activated sludge tank 1.

Figure 3:
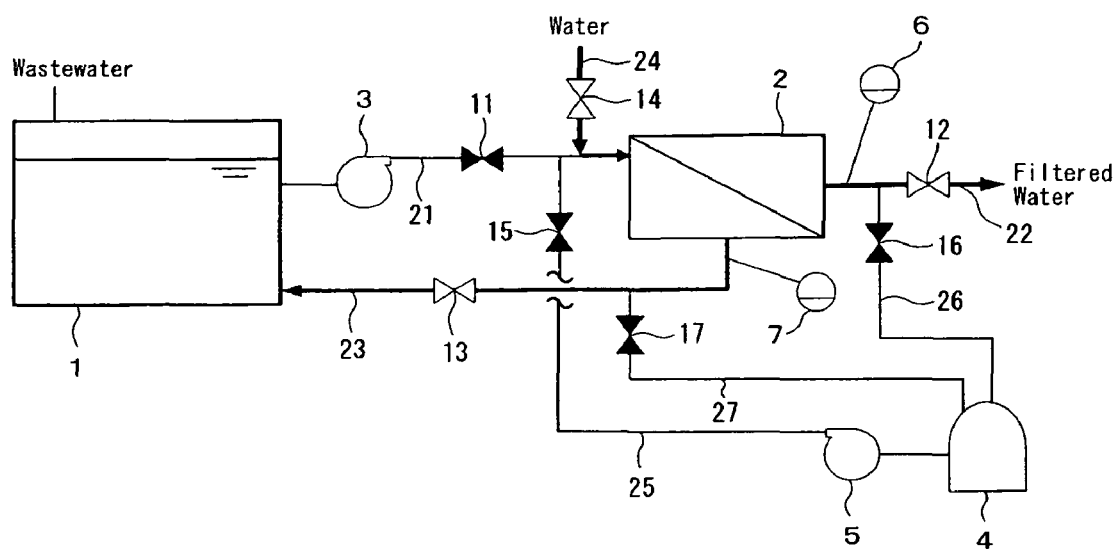
FIG. 3 is an explanatory diagram showing the operation of the apparatus shown in FIG. 1 in the water flushing step (step of replacing the wastewater remaining in membrane module with water).

Then, as shown in FIG. 3, the wastewater remaining in the membrane module 2 is replaced with water in the water flushing step (the first water flushing step). Here, the valve 11 is closed and the valve 14 is opened for supply of water via line 24 at a high flow rate into the membrane module 2, for example, by pump. The wastewater remaining in the membrane module 2 and the sediment on the surface of and in the membrane are flushed off and back into the activated sludge tank 1 via line 23. On the other hand, the filtered water is fed via line 22 out of the system, for example, appropriately for recycling, similarly to the operation shown in FIG. 2.

Figure 4:
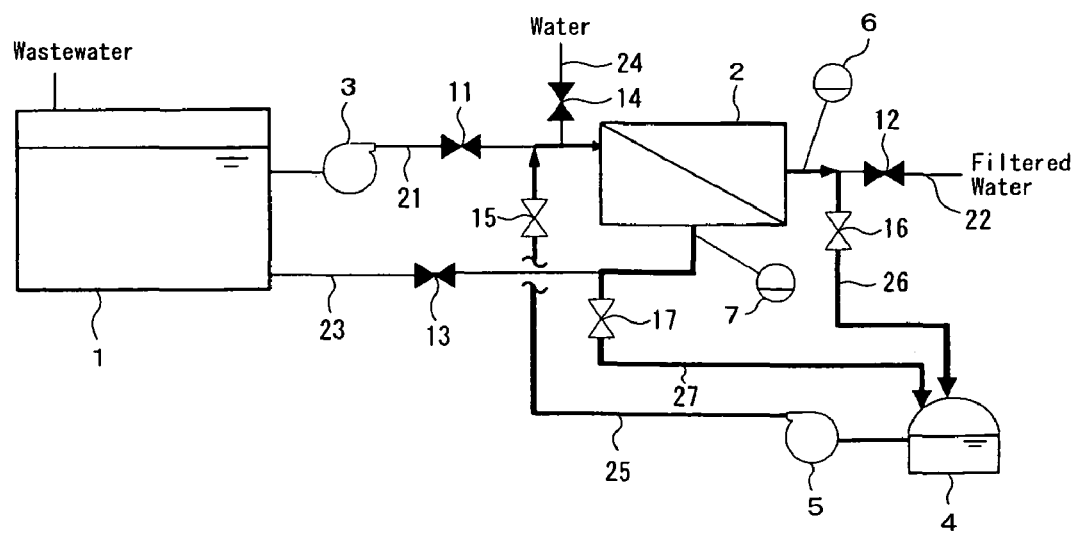
FIG. 4 is an explanatory diagram showing the operation of the apparatus shown in FIG. 1 in the chemical cleaning step.

Then, the valves 12, 13 and 14 are closed, the valves 15, 16 and 17 are opened for operation in the chemical cleaning step, as shown in FIG. 4. If there is no significant fouling or sediment on the surface of and in the membrane, the operation may proceed from the step shown in FIG. 2 directly to the step shown in FIG. 4, while the step shown in FIG. 3 is skipped. "Fouling" means a deposition of hardly soluble components, polymeric solutes, colloids, fine solid matters and others contained in raw water on the membrane, lowering the permeation flux.

As shown in FIG. 4, the valve 11 is disconnected between the activated sludge tank 1 and the membrane module 2 outside the activated sludge tank 1 to prevent the membrane-cleaning agent from contacting the substances contained in the wastewater that react with the membrane-cleaning agent and form hazardous substances or operation-inhibiting substances. The solution of a membrane-cleaning agent such as hypochlorous acid is fed from the tank 4 via line 25 into the membrane module 2 by the pump 5 for cleaning of the surface and the internal region of the membrane. Both of the membrane-filtered membrane-cleaning agent and the membrane-unfiltered membrane-cleaning agent are fed back via lines 26 and 27 into the tank 4 and circulated for use in membrane cleaning. The chemical cleaning of the membrane is preferably carried out under operational control with monitoring by using automatic analyzers 6 and 7 such as a pH meter, electric conductivity meter and chemical densitometer installed downstream of the membrane module 2 or by timer control with or without the monitoring.

Figure 5:
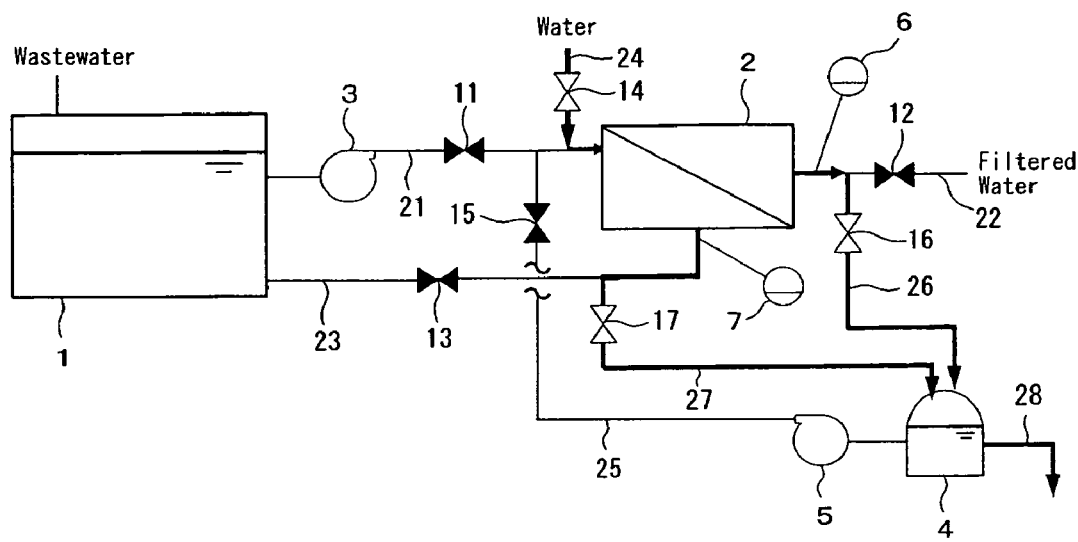
FIG. 5 is an explanatory diagram showing the operation of the apparatus shown in FIG. 1 in the water flushing step (step of replacing the chemical solution remaining in membrane module with water).

Then, as shown in FIG. 5, the valve 15 is closed and the valve 14 is opened for operation in the water flushing step (the second water flushing step). Similarly to the operation shown in FIG. 3, water is fed into the membrane module 2, for replacing the chemical-containing solution remaining in the membrane module 2 with water. At this time, both the membrane-filtered water and the membrane-unfiltered water are not fed back to a place such as a wastewater-receiving tank where the water is brought into contact with wastewater, but respectively fed via lines 26 and 27 back into the tank 4 and then out of the system via line 28. The operation in the water flushing step is also preferably controlled by monitoring with automatic analyzers 6 and 7 or by timer control with or without the monitoring, similarly to the chemical cleaning step above.

The flushing is preferably carried out with water, for example, in an amount of 3 to 5 times larger than the volume of the membrane module, until the concentration of the membrane-cleaning agent in the membrane module becomes a predetermined value or less.

After sufficiently flushing, and also as needed after the chemical cleaning step shown in FIG. 4 and the water flushing step shown in FIG. 5, the valves 14, 16 and 17 are closed, the valves 11, 12 and 13 opened, and the pump 3 initiated, for resumption of filtering operation in the state shown in FIG. 2.

Figure 6:
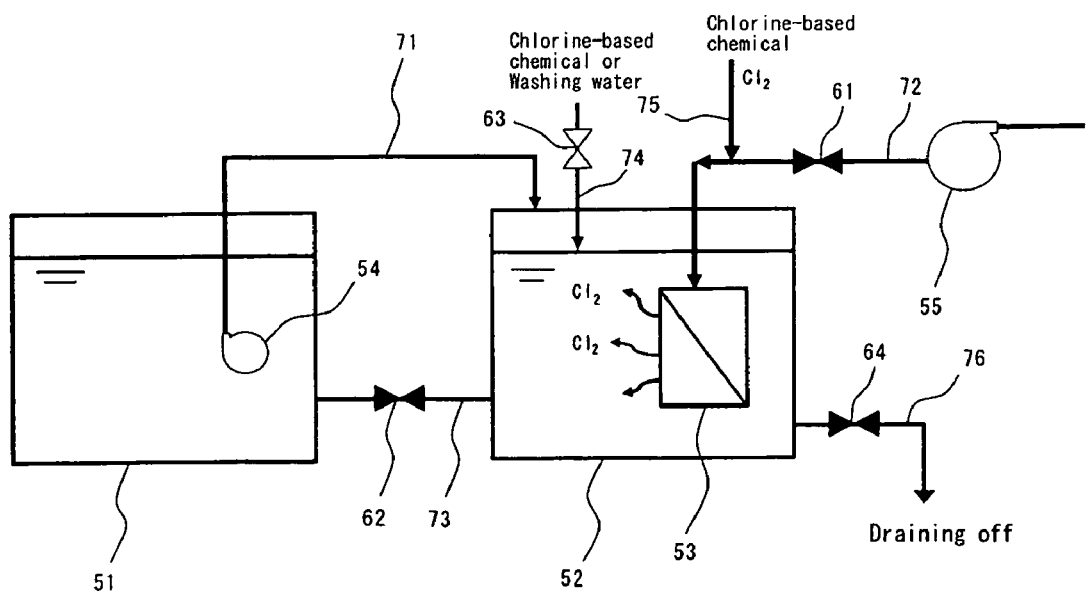
FIG. 6 is an explanatory diagram showing the configuration of another example of the wastewater treatment apparatus according to the present invention, applying an immersion-type membrane-separation activated sludge method.
Figure 7:
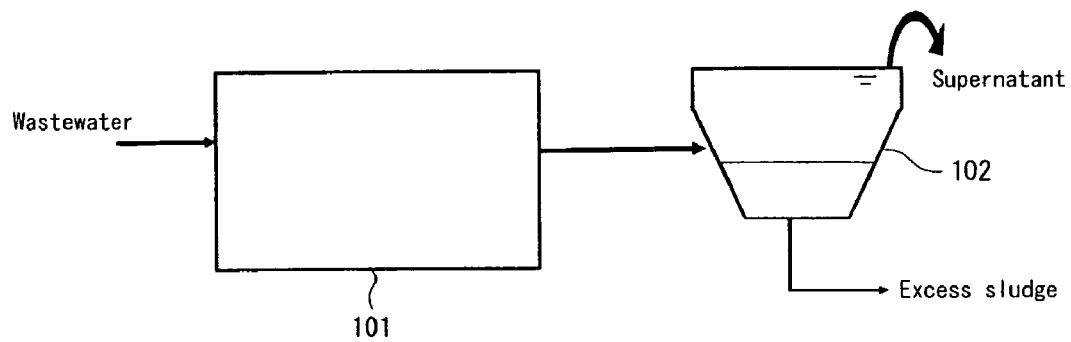
FIG. 7 is a flow chart showing the wastewater treatment by a standard activated sludge method.
Figure 8:
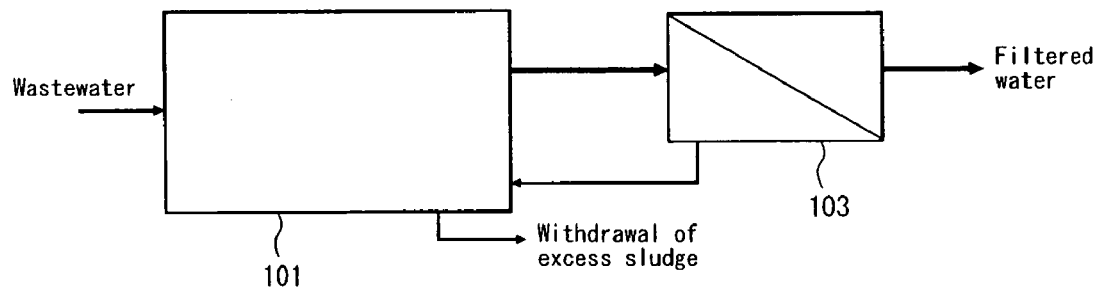
FIG. 8 is a flow chart showing the wastewater treatment by a membrane-separation activated sludge method (membrane bioreactor method: MBR).
Figure 9:
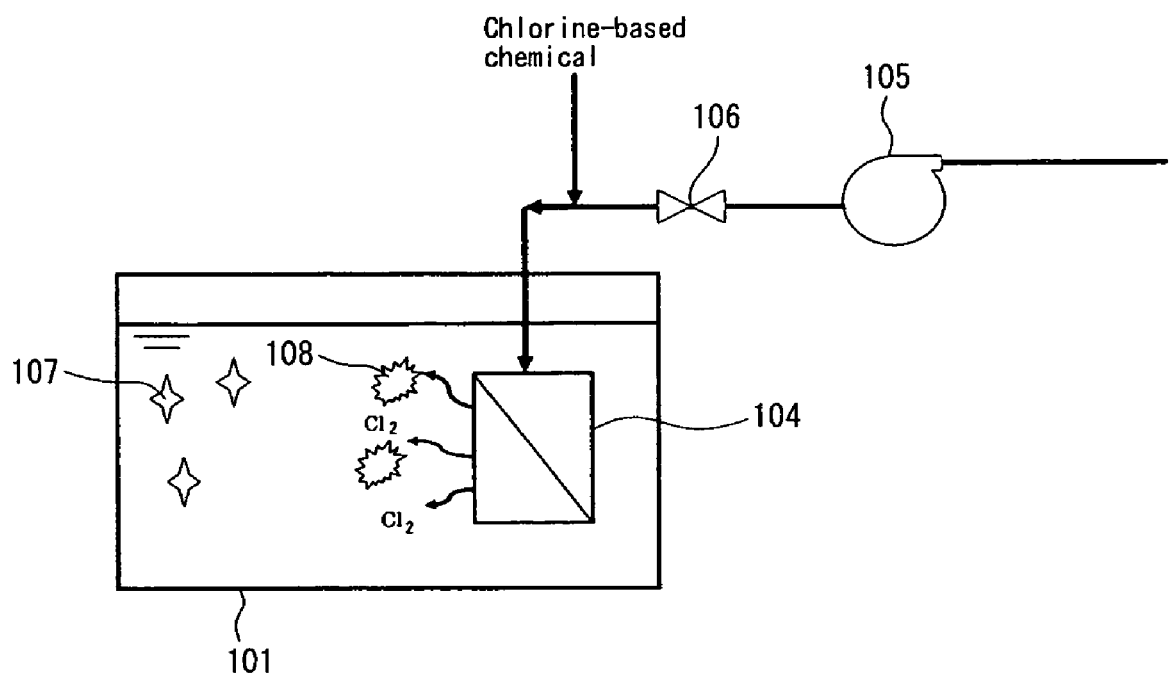
FIG. 9 is a flow chart showing chlorine sterilization by an immersion-type membrane-separation activated sludge method.

Further, another preferred embodiment of the present invention will be described with reference to the FIG. 6. The apparatus shown in the FIG. 6 comprises an activated sludge tank 51, a membrane filtration tank 52 placed outside the activated sludge tank 51 where the membrane filtration tank 52 is filled with water, a membrane module 53 immersed in the membrane filtration tank 52, a wastewater supply pump 54 that supplies the wastewater from the activated sludge tank 51 to the membrane filtration tank 52, a suction pump 55, valves 61 to 64, and lines (pipes) 71 to 76 connecting these elements to each other. The apparatus also may have an automatic analyzer and/or a chemical tank, though they are not shown.

In the apparatus of this embodiment, an immersion-type membrane module 53 is placed in the membrane filtration tank 52, but not in the activated sludge tank 51 as a conventional manner. In this embodiment, the activated sludge tank 51 and the membrane filtration tank 52 are independent of each other, so that a biologically-treating step is conducted in the activated sludge tank 51 and a filtration step and successive steps are conducted in the membrane filtration tank 52.

In this embodiment, it is required that water in the membrane filtration tank 52 is replaced with fresh water after the filtration step before the chemical cleaning step or after the chemical cleaning step before the filtration step, in order to avoid contact of the membrane-cleaning agent with the substances contained in the wastewater that react with the membrane-cleaning agent forming hazardous substances and/or operation-inhibiting substances. Operational flow of the membrane module according to this embodiment will be described below.

First, the wastewater is fed into the activated sludge tank 51, and biologically treated there (step (a)). The activated sludge-mixing wastewater is fed via line 71 into the membrane filtration tank 52 by the wastewater supply pump 54 and filtered by the membrane module 53 (step (b)). The obtained clear filtered water is fed by the suction pump 55 via valve 61 and line 72 out of the system and used, for example, appropriately for recycling. On the other hand, the solids not permeating the membrane is fed with water via valve 62 and line 73 back into the activated sludge tank 51 or exhausted via valve 64 and line 76 out of the system.

Then, the water flushing step is conducted after a halt of the wastewater supply pump 54 to disconnect between the activated sludge tank 51 and the membrane filtration tank 52, to replace the wastewater remaining in the membrane filtration tank 52 with water (step (c)). The water in the membrane filtration tank 52 is fed via line 73 back into the activated sludge tank 51, because the substances in the wastewater remain in the water in the membrane filtration tank 52. Here, the valve 63 is opened for the supply of water via line 74 at a high flow rate into the membrane filtration tank 52, for flushing off the wastewater remaining in the membrane filtration tank 52 and the membrane module 53 and the sediment on the surface and/or in the membrane of the membrane module 53. The effluent after flushing is fed via line 73 back into the activated sludge tank 51. After termination of the flushing, the valves 61 and 62 are closed.

Then, water (preferably filtrated water containing few impurities) is fed into the membrane filtration tank 52 and the membrane-cleaning agent is put into there via line 75 or 74, to conduct the chemical-cleaning of membrane module 53 (step (d)). FIG. 6 shows a flow of chlorine sterilization in the chemical-cleaning step. After termination of the chemical-cleaning, the valve 64 is opened for draining off via line 76.

Then, the water-flushing is conducted to remove the agent remaining in the membrane filtration tank 52 and the membrane module 53 (step (e)). The effluent after flushing is drained off via line 76. After draining, the valve 64 is closed and the membrane filtration tank 52 is filled with water again. The valve 62 is opened and the wastewater supply pump 54 initiated, for resumption of the filtering operation. By repeating these steps (a) to (e), advanced treatment of the wastewater can be conducted safely, and it can promote recycling of the filtered water, for example, as industrial water.

As stated above, by replacing water in the membrane filtration tank 52 with fresh water before and after chemical-cleaning, it is possible to avoid contact of the membrane-cleaning agent with the substances contained in the wastewater that react with the membrane-cleaning agent and form hazardous substances and/or operation-inhibiting substances.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-066721 filed in Japan on Mar. 14, 2008 and Patent Application No. 2009-012105 filed in Japan on Jan. 22, 2009, which are entirely herein incorporated by reference.

What I claim is:

1. A method of treating a wastewater, comprising the steps of:
    feeding a wastewater into an activated sludge tank;
    conducting biological treatment of the wastewater in the activated sludge tank;
    feeding a biologically-treated wastewater containing activated sludge from the activated sludge tank to a membrane module installed outside of the activated sludge tank;
    filtering the biologically-treated wastewater containing activated sludge in the membrane module to produce a treated wastewater;
    disconnecting the membrane module from the activated sludge tank with a valve installed between the membrane module and the activated sludge tank;
    chemically-cleaning the membrane module with a membrane-cleaning agent comprising chlorine or an alkali agent while the membrane module is disconnected from the activated sludge tank by the valve, and
    water-flushing off a substance contained in the wastewater that reacts with the membrane-cleaning agent to form a hazardous substance or an operation-inhibiting substance, or the membrane-cleaning agent remaining in the membrane module, with water, while the membrane module and the activated sludge tank are disconnected from each other by the valve,
    wherein the membrane-cleaning agent is prevented from contacting the substance contained in the wastewater that reacts with the membrane-cleaning agent to form hazardous substances or operation-inhibiting substances and also influence in-tank microbes and the wastewater contains an organic matter which generates a toxic chlorine-based organic matter in a reaction with chlorine or contains a metal which generates a metal compound which precipitates on the surface of the membrane or in the membrane from a reaction with chlorine or an alkali agent.

2. The method of treating a wastewater according to claim 1, wherein the water-flushing step is conducted before and after the chemical-cleaning step; in a first water-flushing step conducted before the chemical-cleaning step, the substance contained in the wastewater that reacts with the membrane-cleaning agent and forms a hazardous substance or operation-inhibiting substance remaining in the membrane module is flushed off with water while the membrane module is disconnected from the activated sludge tank by the valve; and in a second water-flushing step conducted after the chemical-cleaning step, the membrane-cleaning agent remaining in the membrane module is flushed off with water while the membrane module and the activated sludge tank are disconnected from each other by the valve.

3. The method of treating a wastewater according to claim 1, wherein the membrane module is immersed in a membrane filtration tank outside the activated sludge tank, the wastewater supplied into the activated sludge tank and biologically-treated therein is carried away from the activated sludge tank to the membrane filtration tank outside the activated sludge tank by a wastewater supply pump, the filtering step is conducted in the membrane module installed in the membrane filtration tank; the water-flushing step is conducted before and after the chemical-cleaning step, a first water-flushing step is conducted while the wastewater supply pump is halted; the chemical-cleaning step is conducted while the wastewater supply pump is halted and the membrane filtration tank is disconnected from the activated sludge tank by the valve; and a second water-flushing step is conducted while the wastewater supply pump is halted and the membrane module and the activated sludge tank are disconnected from each other with the valve.

4. The method of treating a wastewater according to claim 1, wherein after the chemical cleaning step, chemicals remaining in the membrane module are flushed off with water to a predetermined concentration or less, then the valve disconnecting the membrane module outside the tank and the activated sludge tank is opened.

5. The method of treating a wastewater according to claim 1, wherein the water used for the water flushing step is discharged to a place other than that where it is brought into contact with the wastewater.

6. The method of treating a wastewater according to claim 1, wherein operation of the chemical cleaning step and the water flushing step is controlled with at least one selected from the group consisting of an automatic analyzer and a timer.

7. The method of treating a wastewater according to claim 1, wherein the membrane module is composed of an ultrafiltration membrane, a microfiltration membrane, a reverse osmosis membrane, or an ion exchange membrane.

8. The method of treating a wastewater according to claim 1, wherein the valve is a three-way valve.

* * * * *